| Character | CODE | | | | | |
|---|---|---|---|---|---|---|
| | BITS | | | | | |
| | A | B | 1 | 2 | 4 | 8 |
| BLANK | X | | | | | |
| • | X | 0 | 1 | 2 | | 8 |
| ¤ | X | 0 | | | 4 | 8 |
| & | X | 0 | | | | |
| ‖ | X | | 1 | 2 | | 8 |
| * | X | | | | 4 | 8 |
| – | X | | | | | |
| / | | 0 | 1 | | | |
| , | | 0 | 1 | 2 | | 8 |
| % | | 0 | | | 4 | 8 |
| # | | | 1 | 2 | | 8 |
| @ | | | | | 4 | 8 |
| A | X | 0 | 1 | | | |
| B | X | 0 | | 2 | | |
| C | X | 0 | 1 | 2 | | |
| D | X | 0 | | | 4 | |
| E | X | 0 | 1 | | 4 | |
| F | X | 0 | | 2 | 4 | |
| G | X | 0 | 1 | 2 | 4 | |
| H | X | 0 | | | | 8 |
| I | X | 0 | 1 | | | 8 |
| J | X | | 1 | | | |
| K | X | | | 2 | | |
| L | X | | 1 | 2 | | |
| M | X | | | | 4 | |
| N | X | | 1 | | 4 | |
| O | X | | | 2 | 4 | |
| P | X | | 1 | 2 | 4 | |
| Q | X | | | | | 8 |
| R | X | | 1 | | | 8 |
| S | | 0 | | 2 | | |
| T | | 0 | 1 | 2 | | |
| U | | 0 | | | 4 | |
| V | | 0 | 1 | | 4 | |
| W | | 0 | | 2 | 4 | |
| X | | 0 | 1 | 2 | 4 | |
| Y | | 0 | | | | 8 |
| Z | | 0 | 1 | | | 8 |
| ZERO | | | | 2 | | 8 |
| 1 | | | 1 | | | |
| 2 | | | | 2 | | |
| 3 | | | 1 | 2 | | |
| 4 | | | | | 4 | |
| 5 | | | 1 | | 4 | |
| 6 | | | | 2 | 4 | |
| 7 | | | 1 | 2 | 4 | |
| 8 | | | | | | 8 |
| 9 | | | 1 | | | 8 |

LOW
HIGH

FIG. 1

INVENTORS
KELLY B. DAY, Jr.
BY RUSSELL G. RINALDI
Sughrue, Rothwell, Mion & Zinn
ATTORNEYS Oct. 15, 1963 K. B. DAY, JR., ETAL 3,107,339

COMPARING CIRCUIT

Filed Sept. 29, 1960 8 Sheets-Sheet 2

SPECIAL CHARACTER & BLANK DECODER

SPECIAL CHARACTER & BLANK RECOGNITION

FIG. 6 NUMERIC EQUAL RECOGNITION

SPECIAL CHARACTER NUMERIC DECODER

United States Patent Office 3,107,339 Patented Oct. 15, 1963

3,107,339
COMPARING CIRCUIT

Kelly B. Day, Jr., Poughkeepsie, and Russell G. Rinaldi, Red Hook, N.Y., assignors to International Business Machines Corporation, New York, N.Y., a corporation of New York Filed Sept. 29, 1960, Ser. No. 59,296
8 Claims. (Cl. 340—146.2)

This invention relates to comparing circuits and more particularly to a comparator which produces outputs indicating that a stored character is of a higher or lower order than an argument character.

In many data processing systems it is necessary to make a comparison between two quantities for making high, low or equal determinations. For example, a comparator may be used in a searching unit for finding a document in a file wherein many similar documents or information sheets are arranged in an orderly sequence according to a title or other identifying indicia. Such a file may contain documents which are arranged alphabetically in accordance with the names of customers and a particular document may be mechanically selected and withdrawn by a servomechanism controlled by a comparison circuit. The file would be searched by comparing the name from a given document with the name being sought and the search would proceed in one direction or the other dependent upon whether the compared name was alphabetically higher or lower than the sought after name. Similarly, a search might be performed for a document having the same number or other indicia as the number on a given document.

In the prior art, comparison circuits have been used in conjunction with such a file search. However, prior art comparing circuits have not been completely satisfactory in some applications. For example, in the application of John A. Stock entitled "Comparing Circuit," filed Feb. 16, 1959, Serial No. 793,370 (Docket 18,011), there is shown a comparing circuit for use in conjunction with a data processing system file search. The comparator of that application is used to compare two signals which are encoded in a six-bit code. In order to make the comparison, the circuit of that application converts the six-bit code into a modified eight-bit code and uses a binary adder to effect a comparative result. It would be desirable to provide a comparator which operates directly on the six-bit code. Such a comparator could give high, low or equal outputs and in addition produce information indicative of the alphabetic or numeric characters being compared. Such a comparator could also produce direct indications of blanks in any of the signals being compared.

In addition, it would be desirable to eliminate the adders from the comparator circuitry in order to simplify the circuitry. Accordingly, it is an important object of the present invention to provide an improved comparator circuit which operates directly on two six-bit numbers to provide an indication of whether one number is greater than, equal to, or less than the other signal.

It is another object of the present invention to provide an improved comparator utilizing simple logic circuits which can be easily implemented.

It is a further object of the present invention to provide an improved comparator which produces high, low or equal outputs in regard to two input signals and, additionally, produces alphabetic, numeric and blank identifications in regard to the input signals.

These and other objects and advantages of the present invention will become more apparent by reading the following specification and appended claims taken in conjunction with the drawings in which:

FIG. 1 shows the six-bit code used in conjunction with the embodiment shown;

Figure 2:
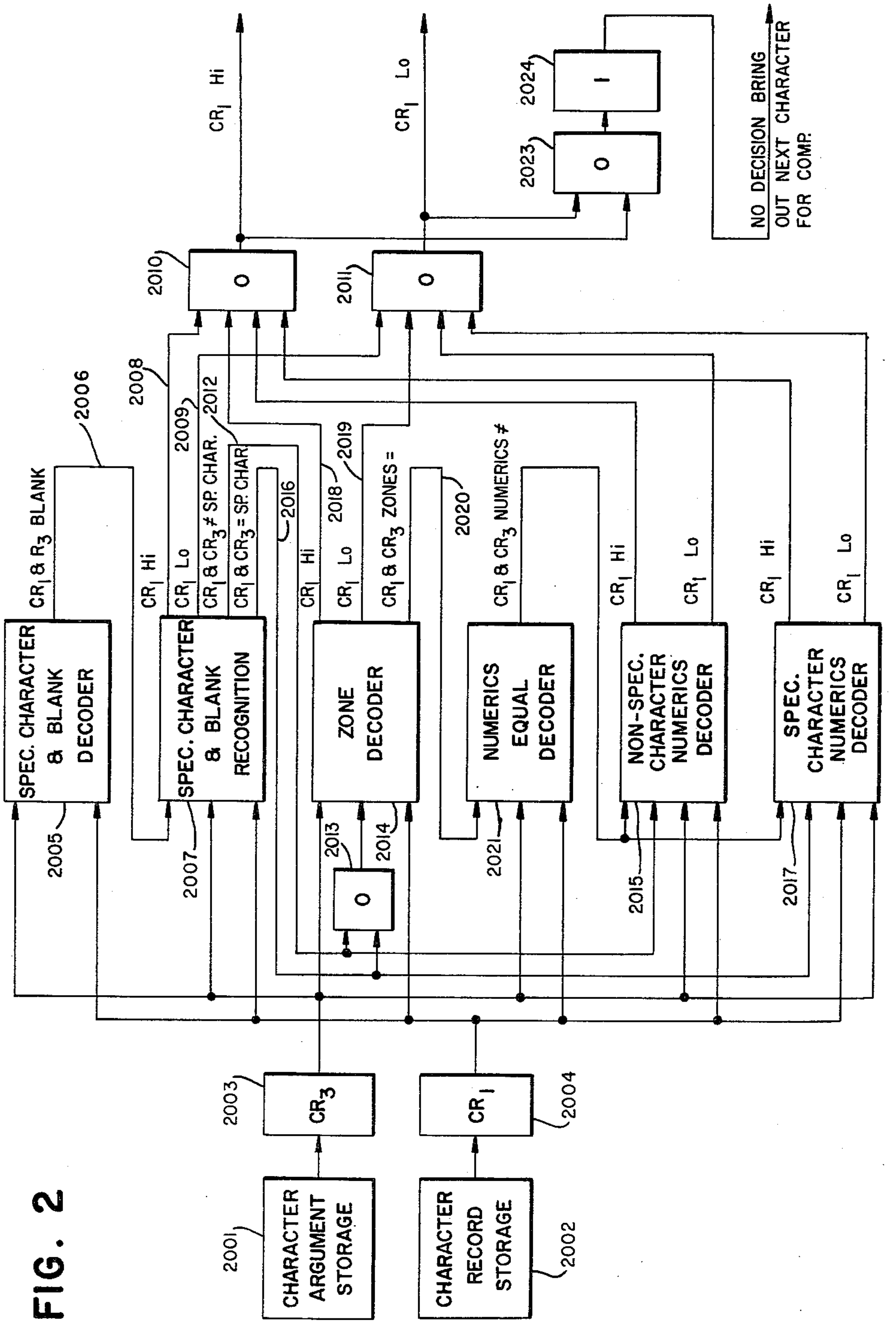
FIG. 2 shows a block diagram of the comparator of the present invention.

In accordance with one embodiment of the invention, a character argument encoded in a six-bit code is compared with stored characters also encoded in a six-bit code. As the argument is compared with each stored character, the comparator produces an output indicating whether the stored character is higher than or lower than the arugment character. These higher than and lower than outputs are used to control the direction in which the file is to be searched.

Referring to FIG. 1, there is shown the six-bit code used in conjunction with the shown embodiment. In such well known codes the 48 characters shown in the left-hand column of FIG. 1 are used presently in accounting machines and the order shown is such that the uppermost character, the blank, lies at one end of the scale which extends down through the 47 other characters ending with the number 9. The 48 different characters are coded by placing an up condition on the lines associated with certain ones of the six-bits in accordance with well known coding techniques. For example, the blank condition is indicated by an up condition of the A bit and the period is represented by an up condition in the A, B, 1, 2 and 8 bits. In this code, the alphabet is divided into three zones and the decimal numbers 0 through 9 constitute a fourth zone. Within each of these four zones the various letters and numbers may be distinguished from each other by the information carried by the last four bits, while the various zones themselves are distinguished from each other by the zone information carried by the first two bits. In making a search through a file, it is necessary to determine whether a particular character in storage is higher than or lower than the associated character of the argument. If the characters are the same, a comparison is made between the next character of the stored information and the associated character of the argument. The comparison process continues until the comparator produces an output indicating that one of the stored characters is higher or lower than the associated character of the argument, in which case the search proceeds to another word in storage. The comparator of the subject invention is particularly suitable for making such a search.

In describing the circuitry of the present invention, the elements of the circuitry will be designated by numerals in which the first number indicates the figure number of the drawings in which the element appears. In identifying the leads which interconnect the elements of the circuitry, the first number indicates the figure number on which the leads appears and the second number indicates the figure number to which the lead goes or from which the lead originates.

In the following description lines, carrying signals indicative of the various bits will be designated merely by the number of that bit, that is, bit 1, 2, 4, 8, etc. Lines carrying signals which are the negation of the bits will be designated by numerals corresponding to the bit but with a bar over them, that is, $\bar{1}$, $\bar{2}$, $\bar{3}$, etc. The negation of any signal is obtained by the use of a simple inverter as is well known in the art.

Referring to FIG. 2, the argument characters are stored in the storage device 2001 and the records to be searched are indicated generally as 2002. The particular character which is to be compared with the associated character of the stored record is transferred to the character storage element 2003 designated $CR_3$. The associated character of the storage record is transferred to the character storage element 2004 designated $CR_1$. Both of these characters are connected to a number of decoding circuits which will subsequently be described in detail. $CR_1$ and $CR_3$ are both connected to the special character and blank decoder 2005. The decoder 2005 recognizes that characters $CR_1$ and $CR_3$ are blank. If both $CR_1$ and $CR_3$ are not blank, the decoder 2005 produces an output over line 2006 which enables a special character and blank recognizer 2007 to proceed with the comparison process. $CR_1$ and $CR_3$ are both connected to the special character and blank recognizer 2007. If one of the characters is blank and the other is not blank, the special character and blank recognizer 2007 produces an output over either line 2008 or 2009 depending upon whether $CR_1$ is high or $CR_1$ is low. These outputs are connected to OR gates 2010 and 2011, respectively, and the outputs of these OR gates provide the output of the comparator indicating either that $CR_1$ is high or $CR_1$ is low.

The special character and blank recognizer 2007 also recognizes whether the two compared characters are special characters. If both $CR_1$ and $CR_3$ are not special characters, the recognizer 2007 produces an output over line 2012 which acts through OR gate 2013 to enable the zone decoder 2014 to proceed with the comparison process. The line 2012 also enables a non-special character numerics decoder 2015 to proceed with the comparison process.

If $CR_1$ and $CR_3$ are special characters, the special character and blank recognizer 2007 produces an output over line 2016 which acts through OR gate 2013 to enable the zone decoder 2014 to proceed with the comparison process and also enables a special character numeric decoder 2017 to proceed with the recognizing process.

The zone decoder 2014 detects whether the zones of the two characters are equal. If the zones are not equal, the zone decoder 2014 produces an output over either line 2018 or 2019 to indicate either that $CR_1$ is high or $CR_1$ is low. If the zones of $CR_1$ and $CR_3$ are equal, the zone decoder 2014 produces an output over line 2020 which enables the numerics equal decoder 2021 to proceed with the comparison. If the numerics of $CR_1$ and $CR_3$ are not equal, the numerics equal decoder 2021 enables the non-special character numerics decoder 2015 and the special character numerics decoder 2017 to proceed with the comparison process.

The outputs of the special character and blank recognizer 2007, the zone decoder 2014, the non-special character numerics decoder 2015, and the special character numerics decoder 2017 are connected to both the OR gates 2010 and 2011. As indicated previously, the output of OR gate 2010 indicates that $CR_1$ is high and an output from OR gate 2011 indicates that $CR_1$ is low. The outputs of both of these OR gates are connected to an OR circuit 2023 and the output of this OR circuit is inverted in an inverter 2024, the output of which indicates that $CR_1$ is neither higher nor lower than $CR_3$. Since the inputs to OR gate 2010 are all down, indicating that $CR_1$ is not higher than $CR_3$, the output of OR gate 2010, forming one input of OR gate 2023, is down. Since the inputs to OR gate 2011 are all down, indicating that $CR_1$ is not lower than $CR_3$, the output of OR gate 2011, forming the other input to OR gate 2023, is down. Since both inputs to OR gate 2023 are down, the output is down and the output of inverter 2024 is up indicating that $CR_1$ is neither higher than nor lower than $CR_3$. The output of inverter 2024 indicates that the characters just compared are equal and that the next characters of the two words of information being compared should be transferred to character storage devices 2003 and 2004 for comparison purposes.

Figure 3:
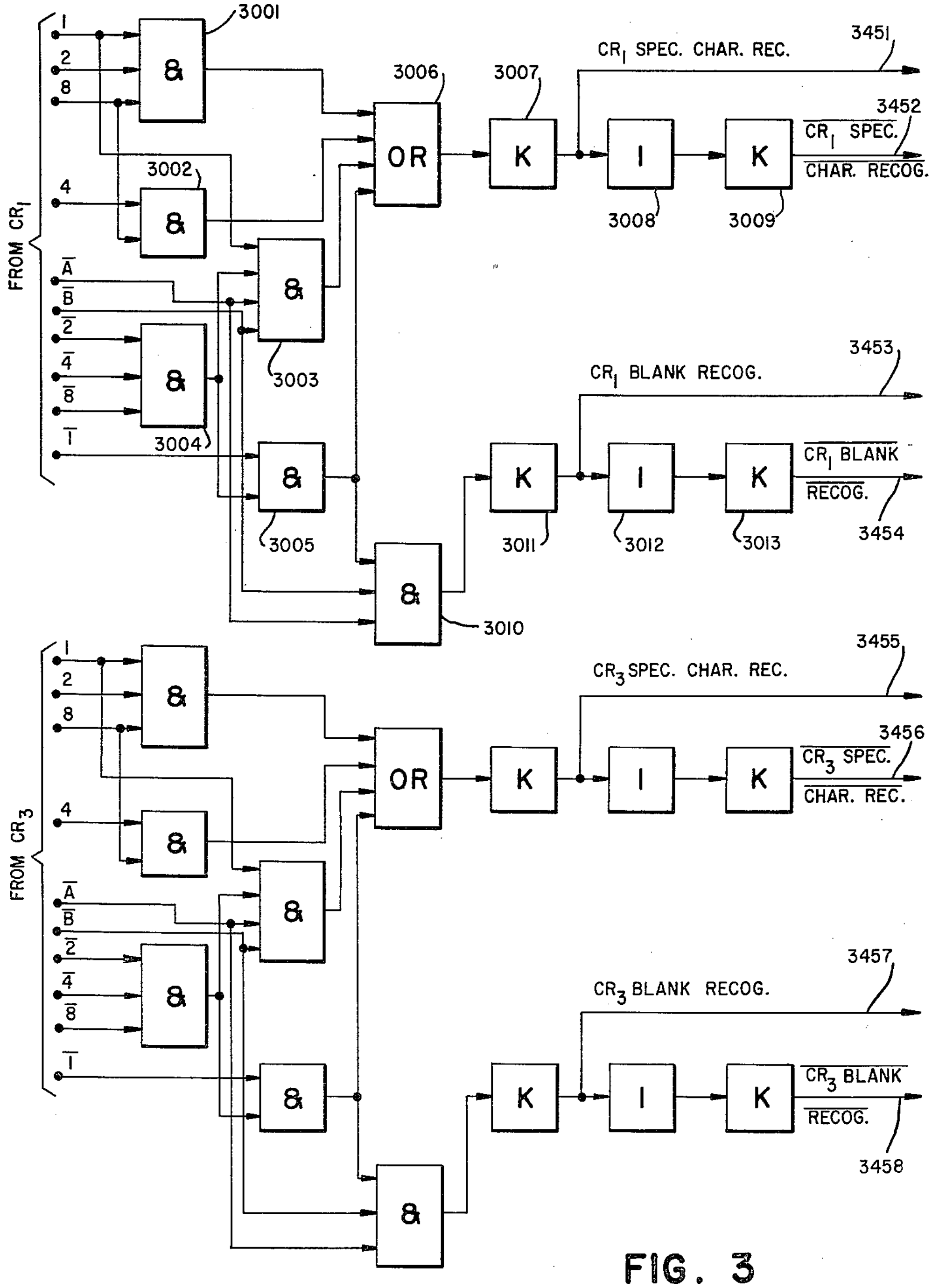
FIG. 3 shows a portion of the special character and blank decoder of the comparator of the present invention.

Referring to FIG. 3, there is shown logical circuitry which produces signals indicating that $CR_1$ and $CR_3$ are or are not special characters and that $CR_1$ and $CR_3$ are or are not blank. The various combinations of up bits which specify that $CR_1$ is a special character are detected by the AND gates 3001–3005. For example, if the 1, 2, and 8 bits of $CR_1$ are up, and AND gate 3001 is enabled, this AND gate, acting through OR gate 3006 and amplifier 3007 produces an output on output line 3451 indicating that $CR_1$ is a special character. The output of amplifier 3007 is also connected through an inverter 3008 and another amplifier 3009 to produce a signal on output line 3452 indicating, when this line is up, that $CR_1$ is not a special character.

The negation of all of the bits of $CR_1$ are connected to AND gate 3010 directly or through AND gate 3005 to AND gate 3010. When $CR_1$ is a blank, the AND gate 3010 is enabled and this AND gate acts through amplifier 3011 to produce a signal on output line 3453 indicating that $CR_1$ is a blank. The output of AND gate 3010 also acts through an inverter 3012 and an amplifier 3013 to produce a signal on 3454 indicating that $CR_1$ is not a blank.

The circuitry thus far described is duplicated in the lower half of FIG. 3 to produce signals indicating whether $CR_3$ is a special character or a blank. These signals appear on line 3455, indicating that $CR_3$ is a special character, line 3456 indicating that $CR_3$ is not a special character, line 3457 indicating that $CR_3$ is a blank, and line 3458 indicating that $CR_3$ is not a blank.

Figure 4:
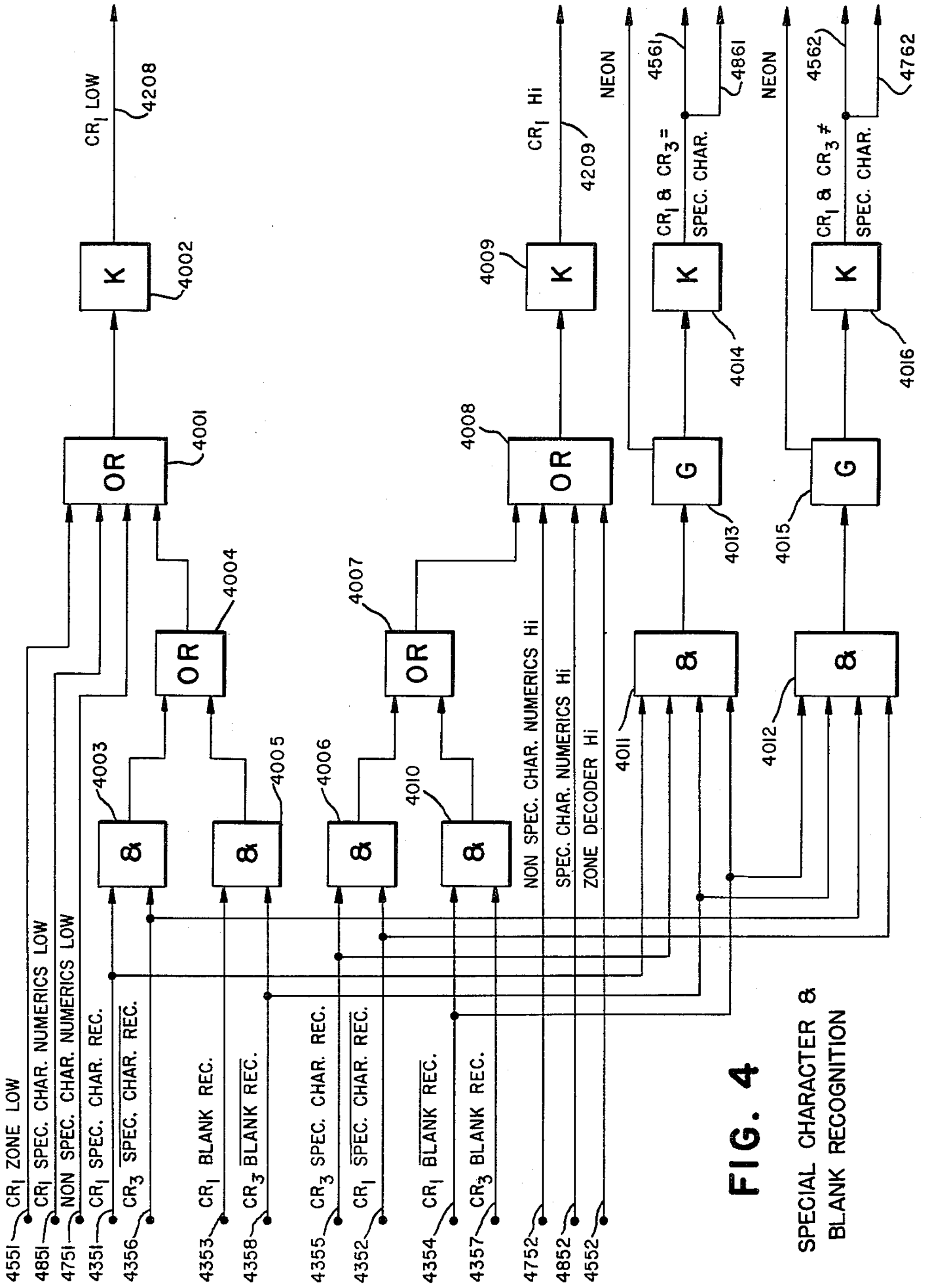
FIG. 4 shows another portion of the special character and blank recognizer of the comparator of the present invention.

Referring to FIG. 4, there is shown circuitry which produces a signal over line 4208 indicating that $CR_1$ is low and a signal over line 4209 indicating that $CR_1$ is high. These two signals are connected to OR gates 2010 and 2011, respectively, to provide the signals which control the direction in which the search is to proceed. The signal $CR_1$ special character numerics low over the line 4851 or the signal non-special character numerics low over line 4751 act through the OR gate 4001 and the amplifier 4002 to produce the signal $CR_1$ low over line 4208. The signal $CR_1$ zone low, on line 4551, also acts through OR gate 4001 and amplifier 4002 to produce the $CR_1$ low signal on output line 4208. Similarly, the signals $CR_1$ special character recognition, on line 4351 and $CR_3$ not a special character, on line 4356 are ANDed in AND gate 4003 and the output of this AND gate acts through OR gate 4004, OR gate 4001 and amplifier 4002 to produce the $CR_1$ low signal on output line 4208. Similarly, the signal $CR_1$ blank, on line 4353, and the signal $CR_3$ not blank on line 4358 are ANDed in AND gate 4005. The output of this AND gate acts through the OR gates 4004 and 4001 and the amplifier 4002 to produce the signal $CR_1$ low on output line 4208.

The signal $CR_3$ special character, on line 4355, and the signal $CR_1$ not a special character, on line 4352, are ANDed in AND gate 4006. The output of this AND gate acts through OR gate 4007 and OR gate 4008 and amplifier 4009 to produce the signal $CR_1$ high on output line 4209. Similarly, the signal $CR_1$ not blank, on line 4354, and signal $CR_3$ blank on line 4357 are ANDed in AND gate 4010. The output of this AND gate acts through OR gate 4007, OR gate 4008, and amplifier 4009 to produce the signal $CR_1$ high on line 4209. Each of the signals non-special character numerics high, on line 4752, special character numerics high on line 4852, and zone decoder high on line 4552, acts through the OR gate 4008 and amplifier 4009 to produce the $CR_1$ high signal on output line 4209.

In order to produce signals indicating that $CR_1$ and $CR_3$ are both special characters or $CR_1$ and $CR_3$ are not special characters, AND gates 4011 and 4012 are provided. The signal $CR_1$ special character on line 4351 and the signal $CR_3$ special character on line 4355 are both connected to AND gate 4011. Also connected to AND gate 4011 are the signals $CR_1$ not blank from line 4354 and the signal $CR_3$ not blank from line 4358. When all of these signals are up, the AND gate 4011 is enabled and this AND gate acts through the neon driver 4013 and cathode follower 4014 to produce the signal $CR_1$ and $CR_3$ equal special character on line 4561. In a similar manner, the signals $CR_3$ not special character, $CR_1$ not special character, $CR_1$ not blank, and $CR_3$ not blank are ANDed in AND gate 4012. The output of this AND gate acts through neon driver 4015 and cathode follower 4016 to produce the signal $CR_1$ and $CR_3$ not special characters.

Figure 5:
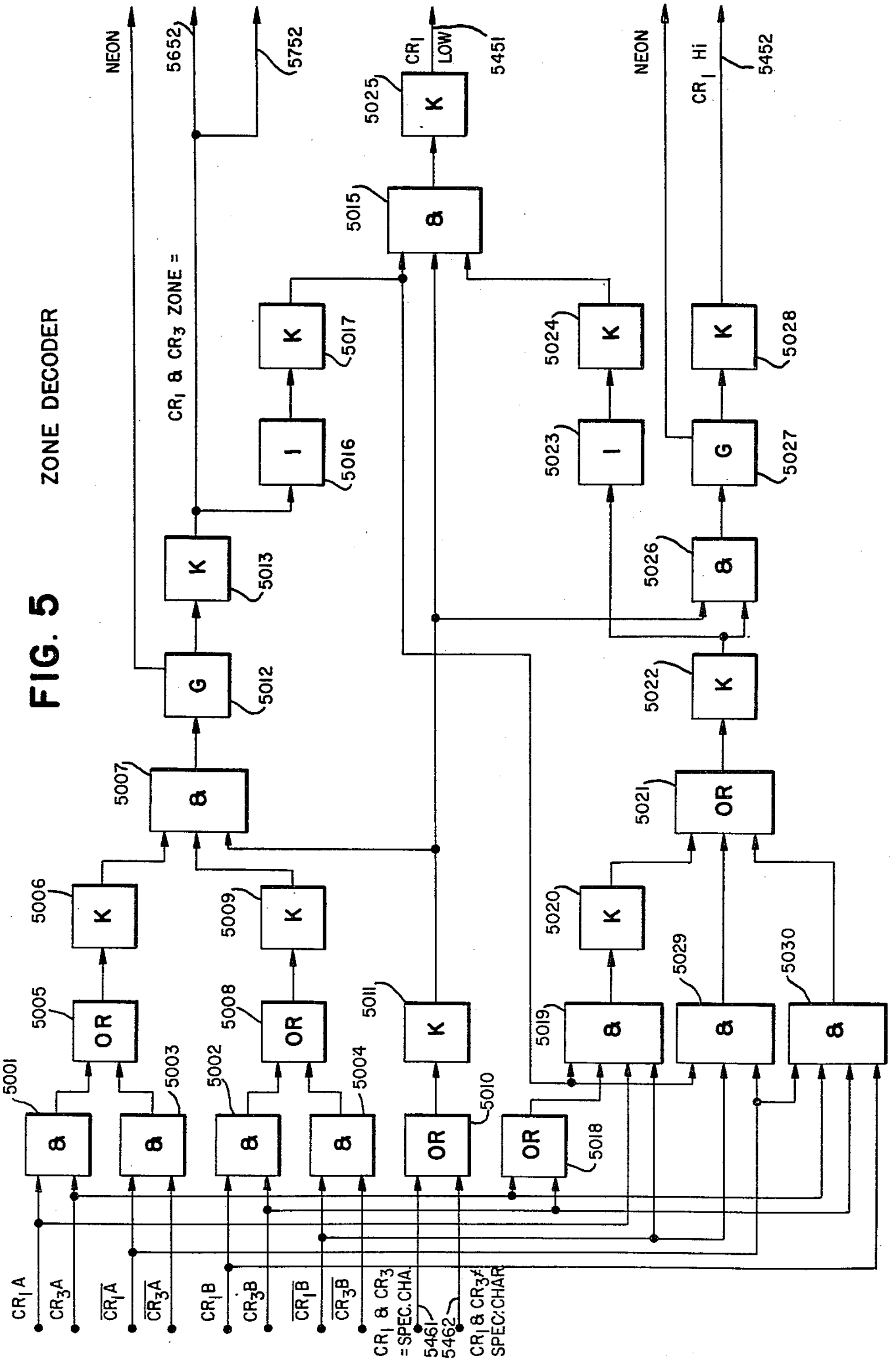
FIG. 5 shows the zone decoder of the comparator of the present invention.

In order to produce signals indicating that the zones of the two characters being compared are equal or not equal, the circuitry of FIG. 5 is provided. The A and B bits of $CR_1$ and $CR_3$ are compared with each other in AND gates 5001 and 5002, respectively. The negation of the A and B bits of $CR_1$ and $CR_3$ are compared in AND gates 5003 and 5004, respectively. The outputs of AND gates 5001 and 5003 act through OR gate 5005 and cathode follower 5006 to enable one leg of the AND circuit 5007. Similarly, the outputs of AND gates 5002 and 5004 act through OR gate 5008 and cathode follower 5009 to enable the second leg of AND gate 5007.

The signal $CR_1$ and $CR_3$ equal special character or the signal $CR_1$ and $CR_3$ not equal special character acts through OR gate 5010 and cathode follower 5011 to enable the third leg of AND gate 5007. When AND gate 5007 is enabled, the output of this AND gate acts through the grounded grid amplifier 5012 and the cathode follower 5013 to produce the signal $CR_1$ and $CR_3$ zones equal on output line 5652.

The output of amplifier 5010 is also used to enable the middle leg of an AND gate 5015. The top leg of the AND gate 5015 is enabled by the negation of the signal $CR_1$ and $CR_3$ zones equal obtained from the output of amplifier 5013. This signal is inverted in inverter 5016 and the output of this inverter is connected through a cathode follower 5017 to the top leg of AND circuit 5015.

The A bit of $CR_3$ or the B bit of $CR_3$ acts through OR gate 5018 to enable the second leg of AND gate 5019. The top leg of AND gate 5019 is enabled by the negation of the $CR_1$ and $CR_3$ zones equal signal taken from the output of cathode follower 5017. The A bit of $CR_1$ and the negation of the B bit of $CR_1$ enable the other two inputs to AND gate 5019. The output of AND gate 5019 acts through cathode follower 5020, OR gate 5021, and cathode follower 5022, inverter 5023 and cathode follower 5024 to enable the third leg of AND gate 5012. When AND gate 5015 is enabled the output acts through cathode follower 5025 to produce the signal $CR_1$ low on output line 5451. The output of cathode follower 5022 also enables one leg of AND gate 5026, the other leg of which is enabled by the signal from the cathode follower 5011. The output of AND gate 5026 acts through the grounded grid amplifier 5027 and the cathode follower 5028 to produce the signal $CR_1$ high on output line 5452. This signal may also be produced by enabling AND gates 5029 or 5030, each of which can act through OR gate 5021, cathode follower 5022, AND gate 5026, grounded grid amplifier 5027, and cathode follower 5028 to produce the $CR_1$ high signal.

Figure 6:
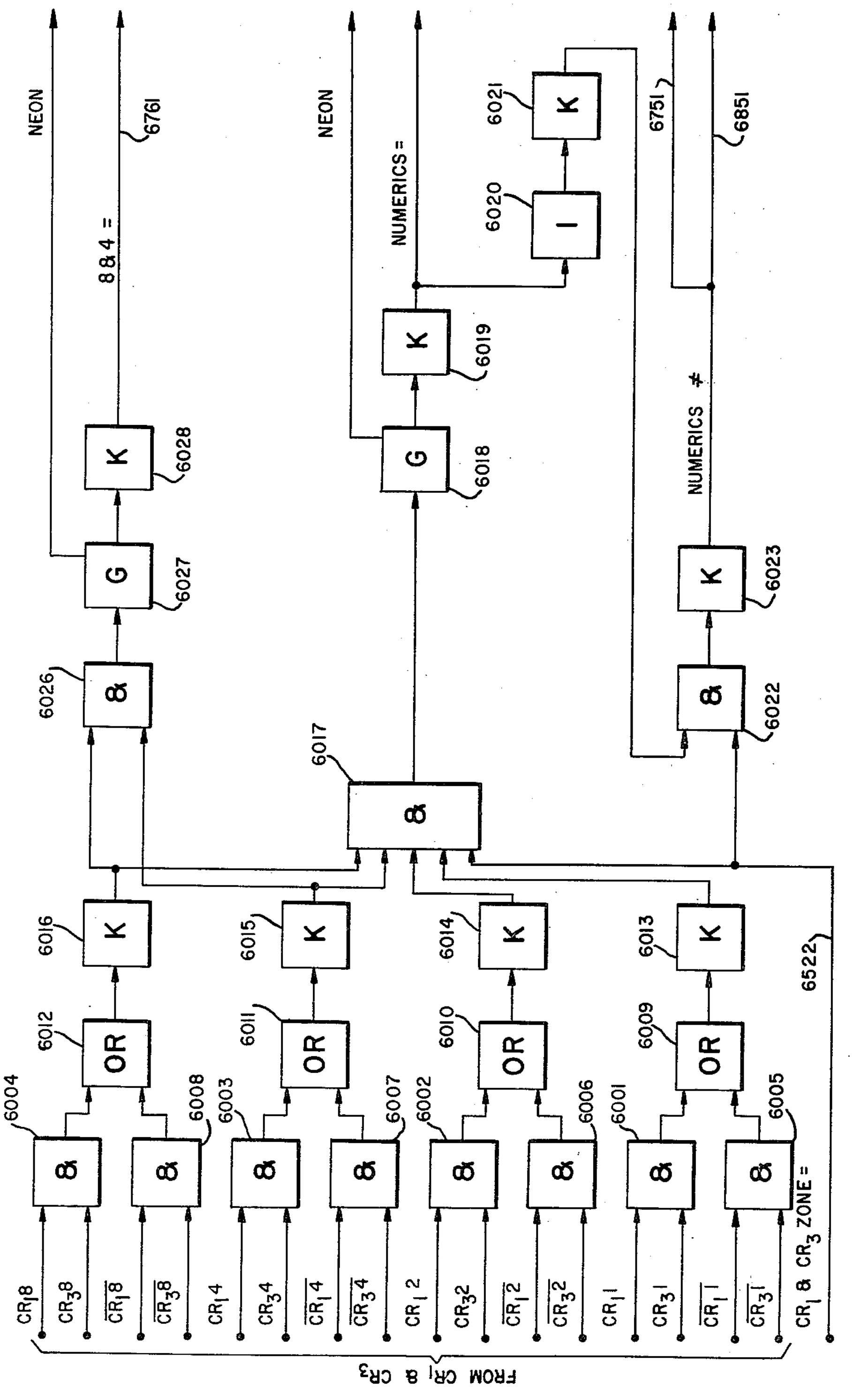
FIG. 6 shows the numeric equal recognition circuitry of the comparator of the present invention.

In order to compare the numeric bits of the $CR_1$ and $CR_3$ characters, the circuitry of FIG. 6 is proved. The 1, 2, 4, and 8 bits of $CR_1$ and $CR_3$ are compared in AND gates 6001–6004. The negation of the 1, 2, 4 and 8 bits of $CR_1$ and $CR_3$ are compared in AND gates 6005–6008. The outputs of these AND gates are connected through OR gates 6009–6012 and cathode followers 6013–6016 to enable the inputs to the AND gate 6017. The output of this AND gate acts through the grounded grid amplifier 6018 and cathode follower 6019 to produce the numerics equal signal. The output of cathode follower 6019 is inverted in inverter 6020 and connected through cathode follower 6021 to enable one leg of AND gate 6022. The other leg of AND gate 6022 is enabled by the $CR_1$ and $CR_3$ zones equal signal over the line 6552. The output of AND gate 6022 acts through cathode follower 6023 to produce the numerics not equal signal on output line 6851.

The outputs of cathode followers 6015 and 6016, indicating that the 4 and 8 bits of $CR_1$ and $CR_3$ are equal enable AND gate 6026. The output of this AND gate acts through grounded grid amplifier 6027 and cathode follower 6028 to produce the signal 8 and 4 equal on line 6761.

Figure 7:
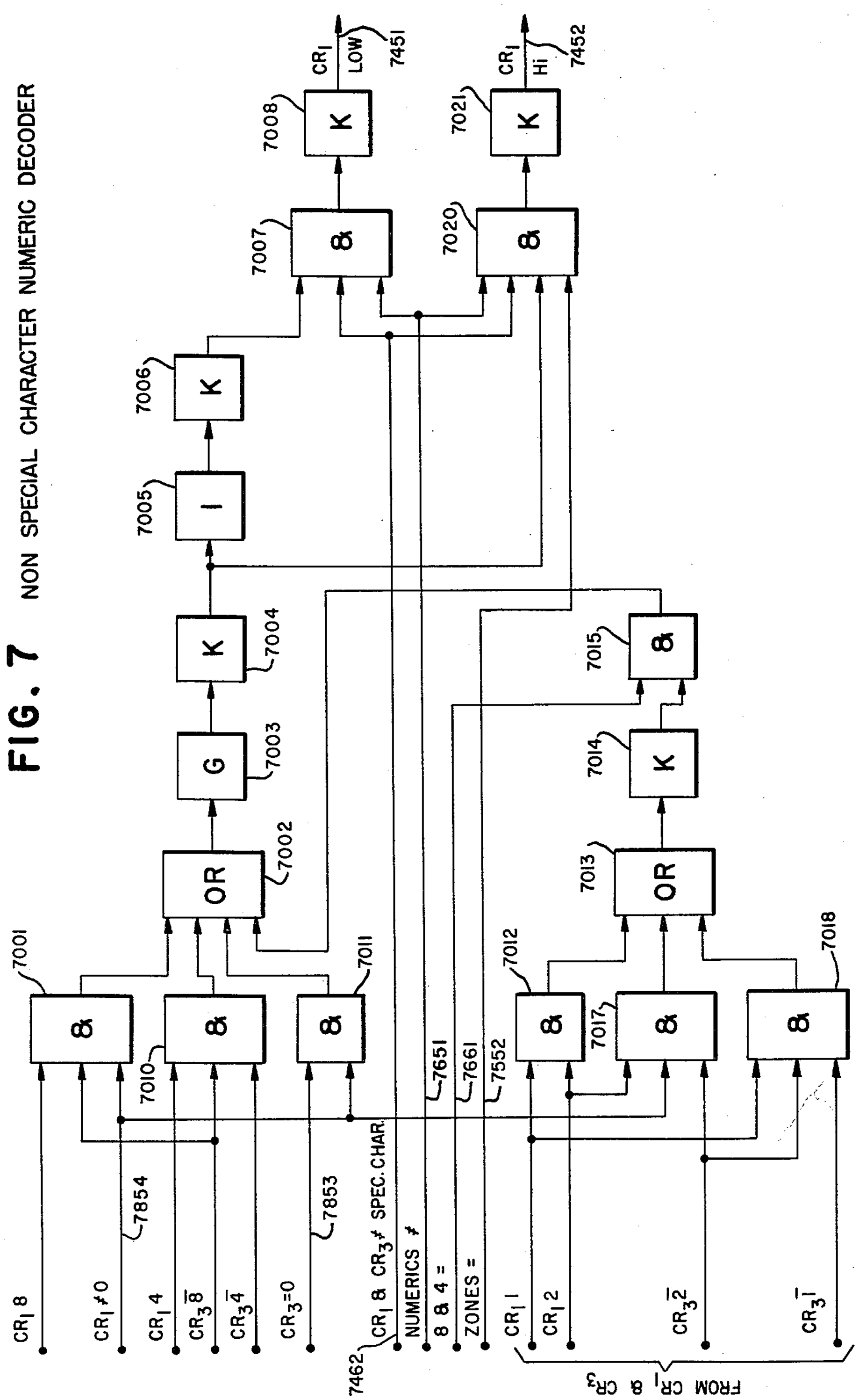
FIG. 7 shows the non-special character numeric decoder of the comparator of the present invention.

In order to compare the numeric portions of non-special characters, the circuitry of FIG. 7 is provided. The 8 bit of $CR_1$, the negation of the 8 bit of $CR_3$ and the $CR_1$ not equal to 0 signal over line 7854 are ANDed in the AND gate 7001. The output of this AND gate acts through OR gate 7002, grounded grid amplifier 7003, cathode follower 7004, inverter 7005, and cathode follower 7006 to enable one leg of AND gate 7007. The other two legs of AND gate 7007 are enabled by the $CR_1$ and $CR_3$ not special character signal over line 7462 and the numerics not equal signal over line 7651. The output of AND gate 7007 acts through cathode follower 7008 to produce the $CR_1$ low signal over on line 7451.

Similarly, the 4 bit of $CR_1$, the negation of the 8 bit of $CR_3$ and the negation of the 4 bit of $CR_3$ are ANDed in AND gate 7010, the output of which acts through OR gate 7002 to eventually produce the $CR_1$ low signal on line 7451. The $CR_3$ equals 0 signal on line 7853 and the $CR_1$ not equal to 0 signal on line 7854 are ANDed in AND gate 7010, the output of which may also act through OR gate 7002 to produce the $CR_1$ low signal on line 7451.

The 1 and 2 bits of $CR_1$ are ANDed in AND gate 7012. The output of this AND gate acts through OR gate 7013 and cathode follower 7014 to enable one leg of AND gate 7015. The other leg of AND gate 7015 is enabled by the 8 and 4 equal signals over line 7661. The output of AND gate 7015 may also act through OR gate 7002 to produce the $CR_1$ low signal on line 7451.

The OR gate 7013 may also be enabled by AND gate 7017, the output of which indicates that bit 2 of $CR_1$ is up, $CR_1$ is not equal to 0, and $CR_3$ is not equal to 2.

The OR gate 7013 may also be enabled by the output of AND gate 7018 which indicates that the 1 bit of $CR_1$ is up, the 2 bit of $CR_3$ is not up, and the 1 bit of $CR_3$ is not up.

In order to produce the $CR_1$ high signal on line 7452, the AND gate 7020 is provided. The inputs to this AND gate are enabled by the output of cathode follower 7004, the numerics not equal signal on line 7651, the $CR_1$ and $CR_3$ not special character signals on 7462, and the zones equal signal on line 7552. The output of AND gate 7020 acts through cathode follower 7021 to produce the $CR_1$ high signal.

Figure 8:
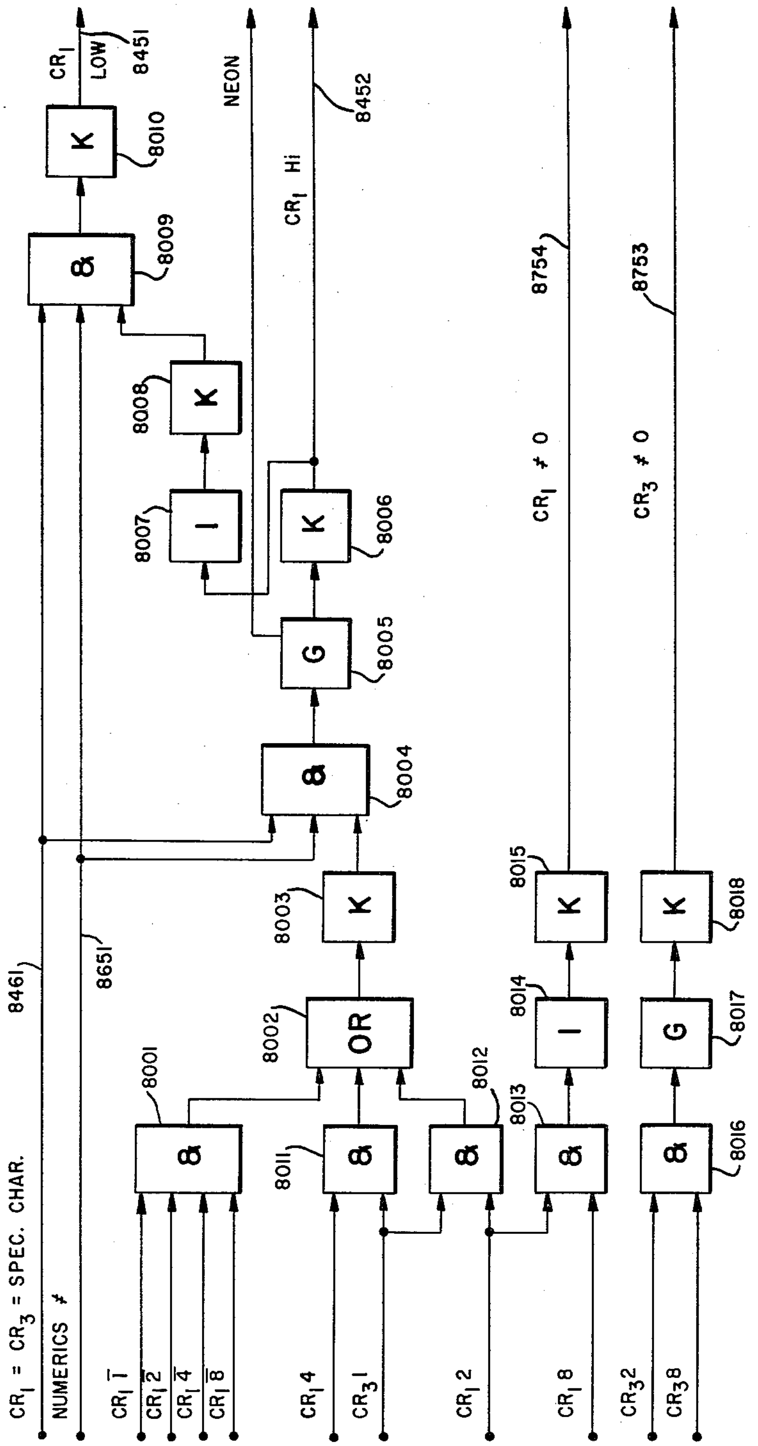
FIG. 8 shows the special character numeric decoder of the comparator of the present invention.

In order to compare the numerics of the special characters, the circuitry of FIG. 8 is provided. The negation of the 1, 2, 4 and 8 bits of $CR_1$ are ANDed in AND gate 8001. The output of AND gate 8001 acts through OR gate 8002, and cathode follower 8003, to enable one leg of AND gate 8004. The other inputs to AND gate 8004 are enabled by the $CR_1$ and $CR_3$ equal special character signals and the numerics not equal signal. The output of AND gate 8004 acts through the grounded grid amplifier 8005 and the cathode follower 8006 to produce the $CR_1$ high signal on output line 8542. The $CR_1$ high signal is inverted in the inverter 8007, the output of which acts through the cathode follower 8008 to enable one leg of AND gate 8009. The other two inputs to AND gate 8009 are enabled by the $CR_1$ and $CR_3$ equal special character signal and the numerics not equal signal. The ouput of AND gate 8009 acts through cathode follower 8010 to produce the $CR_1$ low signal on output line 8451.

The OR gate 8002 may also be enabled by the output of AND gate 8011 which is in turn enabled by the 4 bit of $CR_1$ and the 1 bit of $CR_3$. The OR gate 8002 may also be enabled by the output of AND gate 8012 which is in turn enabled by the 1 bit of $CR_3$ and the 2 bit of $CR_1$.

In order to produce a signal indicating that $CR_1$ is not equal to 0, the AND gate 8013 is provided. The 2 bit of $CR_1$ and the 8 bit of $CR_1$ are ANDed in AND gate 8013, the output of which is inverted by the inverter 8014 which acts through cathode follower 8015 to produce the $CR_1$ not equal 0 signal on line 8754. Similarly, the 2 bit of $CR_3$ and the 8 bit of $CR_3$ are ANDed in AND gate 8016, the output of which acts through the grounded grid amplifier 8017 and cathode folower 8018 to produce the $CR_3$ equals 0 signal on line 8753.

While a specific embodiment of the invention has been shown and described, it will, of course, be understood that various other modifications may be made. The appended claims are, therefore, intended to cover any such modification within the true spirit and scope of the invention.

What is claimed is:

1. A comparator of the type which produces outputs indicating that a stored character is of a higher or lower order than an argument character, said characters representing a plurality of special characters, a plurality of alphabetic characters and a plurality of numeric characters each of which includes a predetermined number of zonal bits and a predetermined number of numeric bits, said comparator comprising a special character and blank decoder, said special character and blank decoder producing an output indicating that the argument character and the stored character are not blank, a special character and blank recognizer, said special character and blank recognizer being enabled by the output of said special character and blank decoder, said special character and blank recognizer producing first outputs indicating whether the stored character and said argument character are special characters and second outputs indicating the relative order of magnitude of said argument and stored characters, a zone decoder, said zone decoder being selectively enabled by the first outputs of said special character and blank recognizer, said zone decoder producing an output indicating the relative order of magnitude of said stored and said argument characters, said zone decoder producing outputs indicative of the equality of the zonal bits of the stored and argument characters, a numerics equal decoder, said numerics equal decoder being enabled by the outputs of said zone decoder, said numerics equal decoder producing an output indicating inequality of the numeric bits of the stored and argument characters, a non-special character numerics decoder, said non-special character numerics decoder being enabled by the outputs of said numerics equal decoder and one of said first outputs of said special character and blank recognizer, said non-special character numerics decoder producing an output indicating the relative order of magnitude of the numeric bits of the argument and stored characters, a special character numerics decoder, said special character numerics decoder being enabled by the other of said first outputs of said special character and blank recognizer and the outputs of said numerics equal decoder, said special character numerics decoder producing outputs indicative of the relative order of magnitude of the numeric bits of said argument and said stored characters.

2. A comparator of the type which produces outputs indicating that a stored character is of a higher or lower order than an argument character, said characters being encoded in a 6-bit code representative of twelve special characters, 26 alphabetic characters and ten numeric characters, said 6-bit code including two zonal bits and four numeric bits, said comparator comprising a special character and blank decoder, said special character and said argument character being connected to said special character and the blank decoder, said special character and blank decoder producing an output indicating that the argument character and the stored character are not blank, a special character and blank recognizer, said stored character and said argument character being connected to said special character and blank recognizer, said special character and blank recognizer being enabled by the output of said special character and blank decoder, said special character and blank recognizer producing a first output indicating that both the stored and the argument characters are not special characters, said special character and blank recognizer producing a second output indicating that said stored character and said argument character are both special characters, said special character and blank recognizer producing third and fourth outputs indicating respectively that the stored character is of a higher or lower order than said argument character, a zone decoder, said argument character and said stored character being connected to said zone decoder, said zone decoder being selectively enabled by either the first output of said special character and blank recognizer or said second output of said special character and blank recognizer, said zone decoder producing an output indicating that the zonal bits of the stored character are of a higher order that the zonal bits of the argument character, said zone decoder producing a second output indicating that the zonal bits of said stored character are of a lower order than the zonal bits of said argument character, said zone decoder producing a third output indicating that the zonal bits of the stored and the argument character are equal, a numerics equal decoder, said argument character and said stored character being connected to said numerics equal decoder, said numerics equal decoder being enabled by the third output of said zone decoder, said numerics equal decoder producing an output indicating that the numeric bits of the stored character are not equal to the numeric bits of the argument character, a non-special character numerics decoder, said stored and said argument characters being connected to said non-special character numerics decoder, said non-special character numerics decoder being enabled by the output of said numerics equal decoder and the first output of said special character and blank recognizer, said non-special character numerics decoder producing a first output indicating that the numeric bits of the stored character are of a higher order than the numerics bits of the argument character, said non-special character numerics decoder producing a second output indicating that the numeric bits of said stored character are of a lower order than the numeric bits of said argument character, a special character numerics decoder, said argument character and said stored character being connected to said special character numerics decoder, said special character numerics decoder being enabled by the second output of said special character and blank recognizer and by the output of said numerics equal decoder, said special character numerics decoder producing a first output indicating that the numeric bits of said stored character are of a higher order than the numeric bits of said argument character, said special character numerics decoder producing a second output indicating that the numeric bits of said stored character are of a lower order than the numeric bits of said argument character.

3. The comparator recited in claim 2 and a first OR circuit, the third output of said special character and blank recognizer being connected to said first OR circuit, the first output of said zonal decoder being connected to said first OR circuit, the first output of said non-special character numerics decoder being connected to said first OR circuit, the first output of said special character numerics decoder being connected to said first OR circuit, the output of said first OR circuit indicating that said stored character is of a higher order than the said argument character, a second OR circuit, the fourth output of said special character and blank recognizer being connected to said second OR circuit, the second output of said zonal decoder being connected to said second OR circuit, the second output of said non-special character numerics decoder being connected to said second OR circuit, the second output of said special character numerics decoder being connected to said second OR circuit, the output of said second OR circuit indicating that the stored character is of a lower order than the argument character.

4. The comparator recited in claim 3 and a third OR circuit, the output of said first OR circuit being connected to said third OR circuit, the output of said second OR circuit being connected to said third OR circuit, an inverter, the output of said third OR circuit being connected to said inverter, the output of said inverter indicating that the stored character is equal to the argument character.

5. The comparator recited in claim 2 wherein said special character and blank decoder includes first logic circuitry including first and second AND gates, the numeric bits of said stored character being connected to said first and second AND gates, the outputs of said first and second AND gates indicating that the stored character is a special character, third, fourth and fifth AND circuits, said zonal bits and the negation of said numeric bits of said stored character being connected to said third, fourth and fifth AND circuits, the output of said third AND circuit indicating that the stored character is a special character, the output of said fifth AND circuit indicating that said stored character is a special character, an OR circuit, the outputs of said first AND circuit, said second AND circuit, said third AND circuit, and said fifth AND circuits being connected to said OR circuit, the output of said OR circuit indicating that said stored character is a special character, a sixth AND circuit, said zonal bits of said stored character being connected to said sixth AND circuit, the output of said fifth AND circuit being connected to said sixth AND circuit, the output of said sixth AND circuit indicating that the stored character is blank, and second logic circuitry including seventh and eighth AND circuits, the numeric bits of said argument character being connected to said seventh and eighth AND circuits, the outputs of said seventh and eighth AND circuits indicating that the argument character is a special character, ninth, tenth and eleventh AND circuits, said zonal bits and said numeric bits of said argument character being connected to said ninth, tenth and eleventh AND circuits, the output of said ninth AND circuit indicating that the argument character is a special character, the output of said eleventh AND circuit indicating that the argument character is a special character, a second OR circuit, the outputs of said seventh, eighth, ninth and eleventh AND circuits being connected to said second OR circuit, the output of said second OR circuit indicating that said argument character is a special character, a twelfth AND circuit, said zonal bits being connected to said twelfth AND circuit, the output of said eleventh AND circuit being connected to said twelfth AND circuit, the output of said twelfth AND circuit indicating that said argument character is a blank.

6. The comparator recited in claim 5 wherein the special character and blank recognizer includes a first AND gate, said output indicating that said stored character is a special character being connected to said first AND gate, means for negating the output indicating that the argument character is a special character, the output of said last-named means being connected to said first AND gate, the output of said first AND gate indicating that the stored character is of a lower order than the argument character, a second AND gate, said signal indicating that the stored character is a blank being connected to said second AND gate, means for negating the signal indicating that the argument character is a blank, said last-named means being connected to said second AND circuit, the output of said second AND circuit indicating that the stored character is of a lower order than the argument character, a third AND gate, the signal indicating that the argument character is a special character being connected to said third AND gate, means for negating the signal indicating that the stored character is a special character, said last-named means being connected to said third AND circuit, the output of said third AND circuit indicating that the stored character is of a higher order than the argument character, a fourth AND circuit, means for negating the signal indicating that the stored character is a blank, said last-named means being connected to said fourth AND circuit, said signal indicating that the argument character is a blank being connected to said fourth AND circuit, the output of said fourth AND circuit indicating that the stored character is of a lower order than the argument character, a fifth AND circuit, the signal indicating that the argument character is not a blank being connected to said fifth AND circuit, the signal indicating that the argument character is a special character being connected to said fifth AND circuit, the signal indicating that the stored character is not a blank being connected to said fifth AND circuit, the output of said fifth AND circuit indicating that both the argument character and the stored character are special characters.

7. The comparator recited in claim 2 wherein said zone decoder includes a plurality of AND gates, the zonal bits of said argument character and said stored character being compared in said plurality of AND gates, said plurality of AND gates producing an output indicating that the zonal bits of the argument character are equal to the corresponding zonal bits of the stored character.

8. The comparator recited in claim 2 wherein the numerics equal decoder includes a plurality of AND gates, the numerics bits of said stored character being compared with the corresponding numeric bits of said argument character in each of said AND circuits, a numerics equal AND gate, the outputs of said plurality of AND circuits connected to said numerics equal AND gate producing an output indicating that the numeric bits of said store character are equal to the corresponding numeric bits of said argument character an inverter, the output of said numerics equal AND gate being connected to said inverter, the output of said inverter being the output of said numerics equal decoder.

References Cited in the file of this patent

UNITED STATES PATENTS

| | | |
|---|---|---|
| 2,785,856 | Hobbs | Mar. 19, 1957 |
| 2,885,655 | Smoliar | May 5, 1959 |
| 2,984,824 | Armstrong | May 16, 1961 |